Oct. 28, 1969      A. A. BIEN      3,474,846
LOCKING FASTENER
Filed Oct. 31, 1966
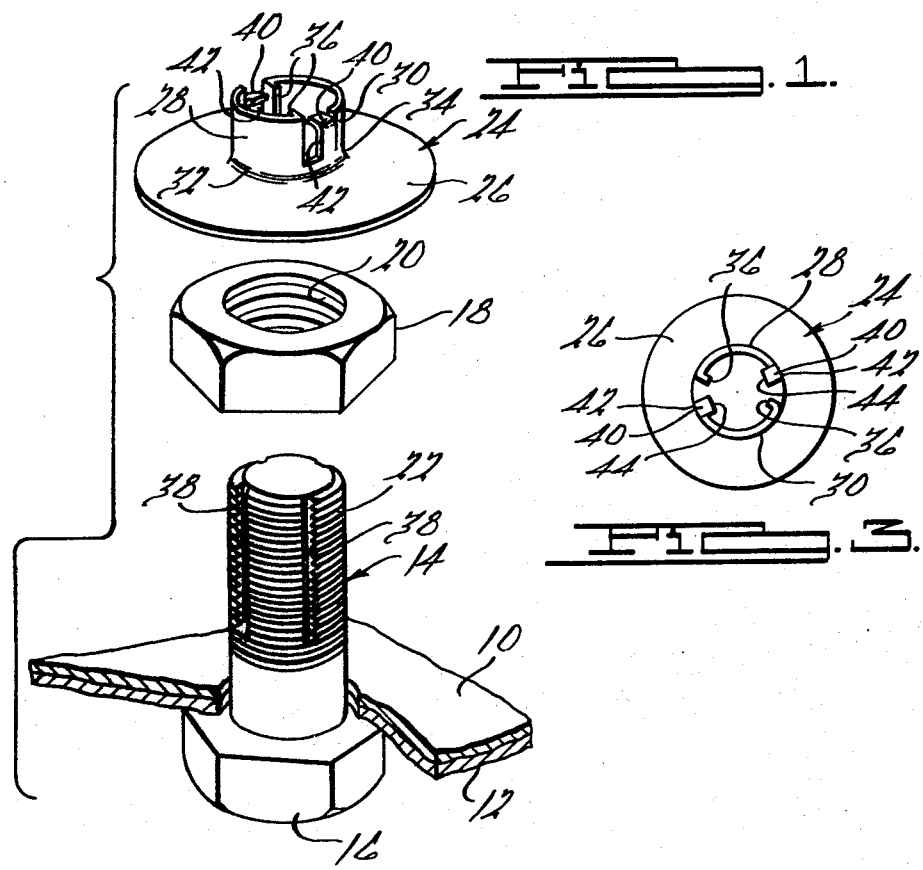
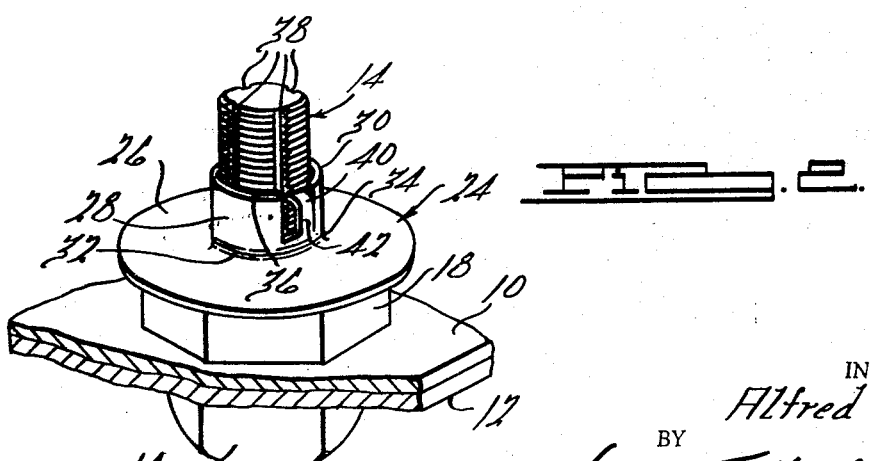
INVENTOR.
Alfred A. Bien
BY
Harness, Talbertt & Baldwin
ATTORNEYS.

United States Patent Office 3,474,846
Patented Oct. 28, 1969

3,474,846
LOCKING FASTENER
Alfred A. Bien, Birmingham, Mich., assignor to Chrysler Corporation, Highland Park, Mich., a corporation of Delaware
Filed Oct. 31, 1966, Ser. No. 590,772
Int. Cl. F16b *39/00, 39/32, 39/04*
U.S. Cl. 151—27                           11 Claims

ABSTRACT OF THE DISCLOSURE

A locking fastener device which is applied to the threaded shank of a bolt after the nut has been threaded onto the bolt and which functions to prevent the accidental loosening of the nut; the fastener comprises a centrally apertured base portion and a pair of arcuate portions extending integrally upwardly from the base portion around the central aperture of the base to define a tubular sleeve for piloting over the free end of the bolt. One vertical edge of each arcuate portion is bent radially inwardly to define a rib which coacts with vertical slots in the bolt to preclude rotation of the fastener member on the bolt and a pair of fingers extend integrally upwardly from the base portion between the spaced adjacent edges of the arcuate portions; these fingers are bent radially inwardly at their upper ends to define tabs which ratchet over the threads of the bolt during application of the fastener and thereafter act to prevent retrograde axial movement of the fastener and nut.

---

This invention relates generally to locked fasteners and more particularly to means capable both of mechanically locking two threadably engaged fastening elements to each other as well as functioning as a fastener element itself.

A general object of this invention is to produce a spring locking means for application to a bolt or screw which can be readily applied in position of use and has elements positively engaging same for effectively militating against axial and rotative movement respectively despite vibrations, jars or shocks which ordinarily tend to loosen or displace fasteners.

A further, more specific, object of this invention is to provide, in a locking retainer of spring metal for application to an axially grooved or fluted bolt or screw, hook elements to snap into such groove portions to resist effectively turning movements and other elements, for engaging the threaded portion of the bolt or screw, which are so formed as to enable said retainer to exhibit a piloting effect during such times as when the retainer is being applied to the cooperating bolt or screw.

The locking fastener of the invention includes a centrally apertured base portion, which may take the form of a disc, and generally upstanding tubular portion. The tubular portion is defined by a pair of arcuate sleeve portions integrally upstanding from the base. Radially directed abutment means are carried by the arcuate sleeve portions and are adapted to impinge against the threaded shank of the bolt to preclude relative rotation between the fastener and the bolt shank and tab means are formed integrally with the base and guide portions and project generally inwardly of the guide portions to engage the thread of the shank and thereby preclude axial movement of the fastener relative to the shank. The tab means are axially spaced a substantial distance above the plane of the base so that a substantial portion of the threaded shank of the bolt may be inserted into the tubular sleeve before the tab means engages the thread, the tubular sleeve thereby effecting a piloting action between the fastener and the shank to facilitate the engagement of the fastener over the shank.

Other objects and advantages of the invention will become apparent when reference is made to the following written description and accompanying drawings wherein:

FIGURE 1 is an exploded view in top perspective partly in section of a fastening assembly employing a retainer constructed in accordance with this invention;

FIGURE 2 is a top perspective view partly in section of the assembly shown in FIGURE 1 with elements thereof in position of use; and FIGURE 3 is a top plan view of the retainer shown in FIGS. 1 and 2.

Referring now in greater detail to the drawings, FIGURE 1 illustrates a pair of superposed panels 10 and 12 which are to be connected together; these panels may have aligned apertures through which a screw-threaded bolt 14 extends, the bolt having a head 16. A nut 18 having an internally threaded portion 20 is intended to threadably engage the externally threaded shank portion 22 of bolt 14 and in so doing being tightened against panel 10 in order to secure the panels 10 and 12 in assembled relation between the nut 18 and head 16 of bolt 14.

In order to preclude nut 18 from becoming completely loosened due to vibrations, jars, shocks and the like, a retainer 24, according to the embodiment shown in FIGURES 1 to 3, is slipped over the end of the bolt until it reaches the nut 18 where it remains in place despite vibrations and the like which would ordinarily result in the continual loosening of the nut 18. Thus, even though the nut 18 may become somewhat loose, it will nevertheless be retained on the screw-threaded bolt 14 thereby insuring securement of the assembly.

Preferably, retainer 24 is comprised of a spring metal base 26 which, even though illustrated as having a circular periphery, may have a periphery of any suitable configuration. Further, as will become evident, even though it is preferred that base or flange 26 be generally tapered or concave as viewed from the flange end, the base or flange 26 may actually be flat. Carried by the flange 26 are oppositely disposed guides or sleeve-like sections 28 and 30 which are integrally joined at their respective innermost ends 32 and 34 to the base or flange 26.

As seen best in FIGURE 3, each of the guides 28 and 30 may be provided with a generally radially inwardly directed abutment portion 36 each of which is adapted to be at least partly received within suitable grooves or flutes 38 formed in the bolt 14. The abutments 36—36 are of a dimension so as to prevent rotation of the retainer 24, in the loosening direction, about the bolt 14 whenever the abutments 36—36 are received within the cooperating grooves 38—38.

In addition to the abutments 36, thread-engaging tabs 40 are also carried by the flange 26. As will be noted from both FIGURES 1 and 2, tabs 40 are axially spaced a substantial distance from the general plane of the base or flange 26. Preferably, each of the tabs 40 is situated at the free end of a generally axially extending finger-like element 42, which is integrally joined to the base 26, and bent to incline inwardly towards the inside of the guide or sleeve sections 28 and 30. The finger elements 42—42 are, of course, relatively resilient and the free end edges 44—44 of the tabs 40 are preferably of an angle closely approximating the helix angle of the threaded portion 22.

In view of the above it can be seen that when the retainer 24 is situated on the bolt 14, as illustrated in FIGURE 3, the abutments 36 effectively preclude rotation of the retainer about the bolt 14 while the tabs 40 engage the thread 22 of bolt 14 thereby precluding axial displacement of the retainer with respect to the bolt 14. All structural stresses are still primarily imposed on the threaded engagement existing between nut 18 and bolt 14 and the retainer 24 is required to absorb only the very minute stresses which may be imposed by virtue of the nut 18 tending to become loosened.

The important advantage of the invention as disclosed is the fact that the tabs 40 are axially spaced from the general plane of the base 26. This enables the retainer to be slipped over the end of the bolt 14 permitting a substantial portion of the bolt to be within the general confines of the guides or sleeve-like sections 28 and 30 before any engagement occurs as between the tabs 40 and the threaded portion 22 of bolt 14. This, in effect, provides a piloting effect for the retainer and percludes cocking of the retainer as would occur if the tabs 40 were in the general plane of the base 26.

In view of the above, it can be seen that after the nut 18 is engaged with the threaded shank portion 22, so as to secure panels 10 and 12 to each other, all that needs to be done is to push the retainer 24 onto the threaded shank 22 until the flange 26 abuts against nut 14. If the abutments 36—36 are not seated in the cooperating grooves 38, the retainer 24 may be rotated until such seating of the abutments is achieved. However, it should be apparent that even if the abutments 36—36 are not seated any subsequent rotation of the retainer due to extraneous forces will eventually effect such seating and further rotation of the retainer 24 will be precluded.

The width of tabs 40 is preferably greater than the width of the grooves 38 thereby enabling the tabs 40 to pass over the grooves 38 without entering them.

It should also be evident that the retainer 24 may also serve as a fastener per se in lieu of serving the function of holding the nut from coming loose. The employment of the retainer 24 in a fastener capacity is of course dependent on the strength of the retainer 24 as well as the anticipated structural stresses of the assembly secured thereby.

Although only a preferred embodiment of the invention has been disclosed and described it should be apparent that other embodiments and modifications of the invention are possible.

I claim:

1. A fastener member for application to a threaded shank, comprising a base portion centrally apertured to receive said threaded shank, sleeve portions upstanding from said base portion around said central aperture and coacting to form an upstanding generally tubular sleeve for piloting receipt of said threaded shank, said sleeve portions being of arcuate form and coacting to define a generally cylindrical bore therewithin concentric with said aperture and having a diameter no greater than that of said shank, radially directed abutment means carried on said sleeve portions and adapted to extend into said bore to impinge against said threaded shank in order to preclude relative rotation between said fastener member and said threaded shank, and tab means formed integrally with one of said portions and projecting generally inwardly of said sleeve portions into said bore for engaging the thread of said threaded shank in order to preclude one-directional axial movement of said fastener member relative to said threaded shank, said tab means being axially spaced a substantial distance above the plane of said base portion enabling the insertion of a substantial portion of said threaded shank into said tubular sleeve before said tab means engages said threaded shank so as to effect a piloting action between said fastener member and said threaded shank during the initial movement of said fastener member onto said threaded shank.

2. A fastener member according to claim 1 wherein said tab means comprises an inwardly bent tab portion formed integrally on the free end of an upstanding axially extending finger-like resilient member which is integrally connected to said base portion.

3. A fastener member according to claim 1 wherein each arcuate section is bent radially inwardly along one side vertical edge to form said abutment means.

4. A fastener member according to claim 1 wherein said tab means comprises a plurality of opposed tabs portions formed integrally on the free ends of axially extending finger-like resilient members each of which is integrally connected to said base portion.

5. The combination of a fastener member and a threaded nut-receiving shank provided with an external generally axial groove in which said fastener member comprises a centrally apertured base portion adapted to pass said shank for disposition adjacent the nut, sleeve portions upstanding from said base around said central aperture for piloting a portion of said shank, said sleeve portions being of arcuate form and coacting to define a generally cylindrical bore therewithin concentric with said aperture and having a diameter no greater than that of said aperture and approximating that of said shank, a tab projecting toward the axis of said sleeve portions into said bore and inclined in a direction away from said base portion to enable the fastener member to be slid along said shank with the tab ratcheting over the threads toward the nut but abuttably engaging the threads to prevent axial retrograde movement, and a hook on the side edge of a sleeve portion adapted to catch in said axial groove upon rotation of said fastener member in order to preclude further rotation of said fastener member, said tab being axially spaced a substantial distance above said base portion in order to permit a substantial portion of said shank to be received within the confines of said sleeve portions before any ratcheting action can take place between said tab and the threads of said shank.

6. A fastener member for application to a threaded shank comprising a base apertured to receive the threads of said shank in order to permit movement of said base around said aperture in tube-like form to receive the threaded shank therebetween, said sleeve sections being of arcuate form and coacting to define a generally cylindrical bore therewithin concentric with said aperture and having a diameter no greater than that of said aperture and approximating that of said shank, hook means on said sleeve sections extending generally radially inwardly therefrom into said bore for impingement against the shank as anti-rotation means, and tab means projecting inclinedly toward the axis of said sleeve sections for engaging the threads of the shank in ratcheting fashion as the fastener member is passed over said shank.

7. A fastener member as claimed in claim 1 in which said hook means comprise a hook on the side edge of and constituted by an inturned edge of each sleeve section so contoured as to ride over the threads when the base is rotated in one direction and resist movement when rotated in the opposite direction.

8. A fastener member as claimed in claim 6 wherein said hook means comprises a hook on a side edge of each sleeve section disposed in alternate arrangement with one hook disposed at one edge of one sleeve section and the other hook disposed at an opposite edge of the other sleeve section remote from said one hook.

9. A fastener member for application to a threaded shank comprising a base portion having a generally central aperture, arcuate sleeve-like sections upstanding from said base portion around said aperture and coacting to define a generally cylindrical bore therewithin concentric with said aperture and having a diameter no greater than that of said aperture and approximating that of said shank, whereby to provide a pilot for said shank, radially directed and axially extending abutment means formed on said sleeve-like sections for engaging said shank to positively prevent accidental rotation of said fastener member with respect to said shank, and generally resilient detent means adapted to engage the threads of said shank in order to permit movement of said fastener member axially of said threaded shank in one direction while preventing movement of said fastener member axially of said threaded shank in a direction opposite to said one direction.

10. The combination of a fastener member and a threaded nut-receiving shank provided with an external axial groove in which said fastener member comprises a base having a generally central aperture to pass said shank for disposition adjacent the nut, arcuate sleeve sections in tube-like form upstanding from said base around said aperture and coacting to define a generally cylindrical bore therewithin concentric with said aperture and having a diameter no greater than that of said aperture and approximating that of said shank, a tab projecting inwardly toward the axis of said sleeve sections and inclined in a direction away from said base to enable the fastener member to be slid along said shank with the tab ratcheting over the threads toward the nut but engaging a thread to prevent retrograde movement, and an inturned hook on an upstanding edge of, and coextensive with, a sleeve section for permitting rotation of the fastener member in one direction while catching in said axial groove when rotated in the opposite direction.

11. The organization as claimed in claim 10 in which the tabs are of greater width than the width of said axial grooves, thereby to ride over same upon relative turning movement of said fastener member and said shank.

References Cited

UNITED STATES PATENTS

| 1,020,668 | 3/1912 | Thompson | 151—29 |
| 1,161,317 | 11/1915 | Kielland | 151—30 |
| 1,934,439 | 11/1933 | Messmer | 151—29 |
| 2,398,827 | 4/1946 | Graham et al. | 151—11 |
| 2,771,113 | 11/1956 | Flora | 151—11 |

FOREIGN PATENTS 9,703   7/1956   Germany.

MARION PARSONS, Jr., Primary Examiner

U.S. Cl. X.R.

151—11, 24, 30